Dec. 18, 1928.
J. G. WEIR
1,695,936
POWER PLANT
Filed Jan. 23, 1926
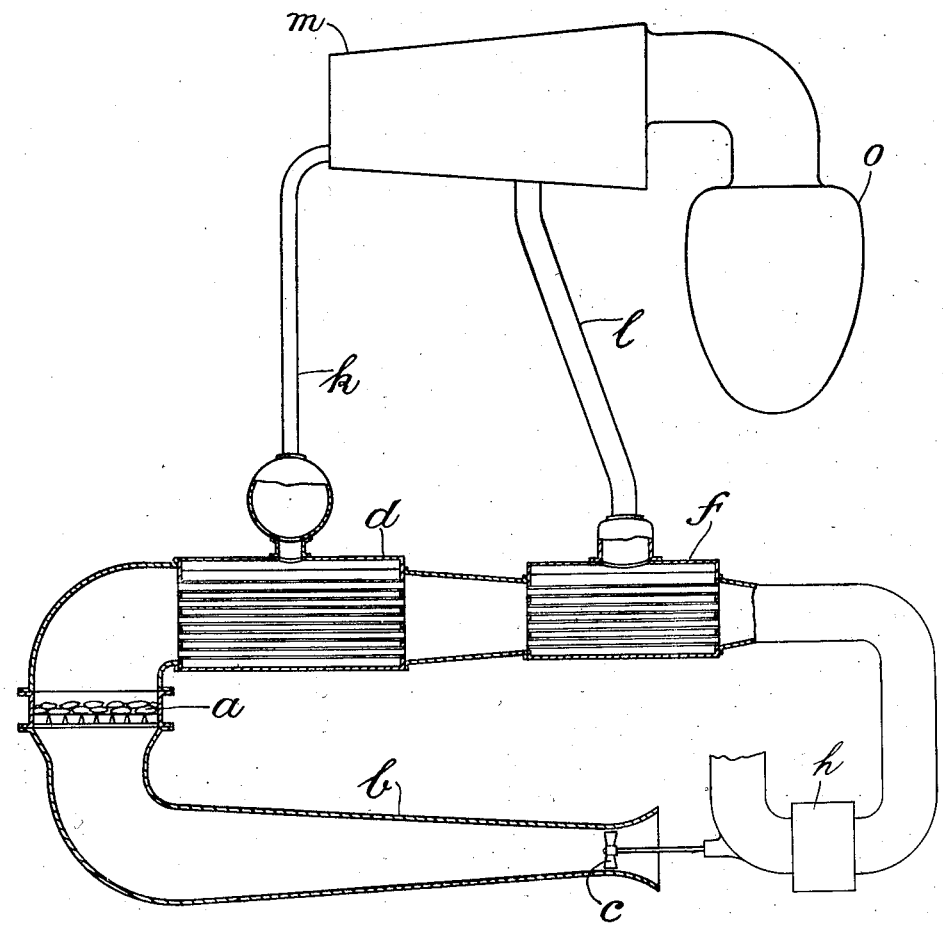
Inventor,
James G. Weir,
By William C. Linton.
Attorney.

Patented Dec. 18, 1928.

1,695,936

UNITED STATES PATENT OFFICE.

JAMES GEORGE WEIR, OF CATHCART, GLASGOW, SCOTLAND, ASSIGNOR TO G. & J. WEIR, LIMITED, OF GLASGOW, SCOTLAND.

POWER PLANT.

Application filed January 23, 1926, Serial No. 83,408, and in Great Britain February 25, 1925.

This invention relates to the combustion of fuel and the utilization of the products of combustion in power production.

In burning certain classes of fuel, or in certain methods, or under certain conditions of burning fuel for power production, the products of combustion are associated with a considerable proportion of water vapour. The generation of this water vapour seriously decreases the effective calorific value of the fuel as ordinarily utilized in power production, the latent heat of the water vapour not being utilized.

The present invention has for its object to recover the latent heat of the water vapour associated with the non-condensable products of combustion.

The temperature of condensation of water vapour depends, as is well-known, on the pressure: there is a definite temperature of condensation for every pressure: the lower the pressure, the lower is the temperature.

Moreover, in a mixture of water vapour and other gases the same rule holds good as regards the water vapour, but the pressure in this case is the partial pressure of the water vapour which is only a portion of the total pressure of the mixture. It follows that, if the pressure of a mixture of water vapour and other gases is raised while the proportions of water vapour and other gases remain the same, the temperature at which the water vapour in that mixture will condense will also be raised.

In power plants involving boilers, a boiler generating steam at a pressure below atmospheric or even slightly above atmospheric is not, if employed by itself, (that is, not in association with other steam generators) usually a practicable arrangement for economic reasons. Steam is usually generated for power production at pressures greatly above atmospheric; and the expression "ordinary boiler", when used in this specification, is intended to mean a boiler in which steam is generated at a pressure very considerably above atmospheric.

It has, however, been proposed (and the plan, if not put into practice, is at least known) to arrange two boilers in series, an ordinary boiler and a low-pressure boiler. Fuel of any desirable nature is arranged to be consumed in any suitable manner so as to provide heat for the ordinary boiler. The hot gases, after doing their work in the ordinary boiler, are led to the low-pressure boiler which, on account of the lower temperature conditions, is fitted to reduce the temperature of the gases to a lower point. The two boilers may be employed to supply actuating steam to the same steam engine, e. g. a turbine, the low-pressure boiler giving its steam to the turbine at a suitable low-pressure stage. By this means it is possible to take a large proportion of the heat out of the hot gases; but it is not, I believe, practicable to recover the latent heat of water vapour in the gases: to do so would involve such a low pressure of steam generation in the low-pressure boiler as to render the arrangement commercially impracticable.

According to the present invention—which will now be described and which will be defined in the annexed claims—I make used of this series arrangement of ordinary and low-pressure boilers. According to the present invention I arrange for the fuel to be burned at a pressure substantially above atmospheric; and I maintain the products of combustion at a pressure substantially above atmospheric in their passage through the two boilers. It is, therefore, possible at the low-pressure boiler to drop the temperature of the hot gases to such a point as to condense the water vapour, and thus recover the latent heat of the same, without having such an exceedingly low temperature that the pressure of generation of steam is impracticably low. It is, in fact, possible according to my invention to generate steam in the low-pressure boiler at a pressure at which it can be employed with advantage and economy in the lower stages of a steam turbine.

The accompanying drawing illustrates diagramatically the carrying of the invention into effect in one convenient manner.

The fuel is burned in a furnace $a$ to which air is supplied through a pipe $b$ by means of the fan $c$. The products of combustion from the furnace $a$ pass first through an ordinary boiler $d$ and then through a low-pressure boiler $f$, the two boilers $d$ and $f$ being arranged in series as regards the flow of the products of combustion from the furnace $a$.

The fan $c$ supplies air to the furnace $a$ at a pressure of 10 pounds per square inch above atmospheric, and this pressure is approximately maintained until the products of combustion leave the low-pressure boiler $f$.

The pressure of steam generation in the low-pressure boiler is such that the temperature is sufficiently low to allow of the condensation of the water vapour associated with the non-condensable products of combustion. The latent heat of this water vapour is thus utilized to advantage in the generation of low-pressure steam which can be utilized for the production of power, as in the arrangement illustrated in the drawing, in which steam from the boiler $d$ is led, by means of the pipe $k$, to the high pressure end of a steam turbine $m$, the low-pressure steam from the boiler $f$ being led, by means of the pipe $l$, to a stage of the turbine $m$ at which the steam pressure is suitable for the efficient utilization of the low-pressure steam. The turbine $m$ exhausts into the condenser $o$.

A turbine $h$ is placed in the discharge flue from the low-pressure boiler. The waste gases are passed through this turbine before being discharged to the chimney. The turbine utilizes the energy due to the pressure of the waste gases. It also acts to maintain the pressure of the gases during their passage through the two boilers.

The fan $c$ may be driven directly by the turbine $h$, the two machines being arranged co-axially if direct drive is employed.

Having thus described my invention, what I claim as new and desire to secure by Letters Patent is:—

1. In the employment for power production of the hot gases resulting from the combustion of fuel and comprising non-condensable gases and water vapour, the method of operation consisting in passing the said gases first through, and utilizing them in, an ordinary boiler and then passing them through, and further utilizing them in, a low-pressure boiler, burning the fuel at a pressure substantially above atmospheric and maintaining the hot gases at a pressure substantially above atmospheric in their passage through the two boilers, utilizing the energy due to the pressure of the said gases, after they have left the said low-pressure boiler, in a turbine placed in the discharge flue of said low-pressure boiler, said turbine acting to maintain the pressure of said gases in their passage through the two boilers, and operating the said low-pressure boiler at such a pressure of steam generation that the temperature is sufficiently low to allow of the condensation of the water vapour in the said hot gases.

2. In the employment for power production of the hot gases resulting from the combustion of fuel and comprising non-condensable gases and water vapour and in which the said gases are first passed through, and utilized in, an ordinary boiler and then passed through, and further utilized in, a low-pressure boiler, the method of operation consisting in burning the fuel at a pressure substantially above atmospheric and maintaining the hot gases at a pressure substantially above atmospheric in their passage through the two boilers, utilizing the energy due to the pressure of the said gases, after they have left the said low-pressure boiler, in a turbine placed in the discharge flue of said low-pressure boiler, said turbine acting to maintain the pressure of said gases in their passage through the two boilers, and operating the said low-pressure boiler at such a pressure of steam generation that the temperature is sufficiently low to allow of the condensation of the water vapour in the said hot gases.

3. In the employment for power production of the hot gases resulting from the combustion of fuel and comprising non-condensable gases and water vapour, the method of operation consisting in passing the said gases first through, and utilizing them in, an ordinary boiler and then passing them through, and further utilizing them in, a low-pressure boiler, burning the fuel at a pressure substantially above atmospheric and maintaining the hot gases at a pressure substantially above atmospheric in their passage through the two boilers, supplying the air for the said burning of the said fuel under a pressure substantially above atmospheric by means of a blower, utilizing the energy due to the pressure of the said gases, after they have left the said low-pressure boiler, in a turbine placed in the discharge flue of said low-pressure boiler, said turbine acting to maintain the pressure of said gases in their passage through the two boilers, driving said blower by means of said turbine, and operating the said low-pressure boiler at such a pressure of steam generation that the temperature is sufficiently low to allow of the condensation of the water vapour in the said hot gases.

4. In the employment for power production of the hot gases resulting from the combustion of fuel and comprising non-condensable gases and water vapour and in which the said gases are first passed through, and utilized in, an ordinary boiler and then passed through, and further utilized in, a low-pressure boiler, the method of operation consisting in burning the fuel at a pressure substantially above atmospheric and maintaining the hot gases at a pressure substantially above atmospheric in their passage through the two boilers, supplying the air for the said burning of the said fuel under a pressure substantially above atmospheric by means of a blower, utilizing the energy due to the pressure of the said gases, after they have left the said low-pressure boiler, in a turbine placed in the discharge flue of said low-pressure boiler, said turbine acting to maintain the pressure of said gases in their passage through the two boilers, driving said blower by means of said turbine, and operating the said low-pressure boiler at such a pressure of steam generation that the temperature is sufficiently low to allow of the condensation of the water vapour in the said hot gases.

5. In the employment for power production of the hot gases resulting from the combustion of fuel and comprising non-condensable gases and water vapour, a plant comprising an ordinary boiler, a low-pressure boiler, means for burning the fuel at a pressure substantially above atmospheric and driving the hot gases, at a pressure substantially above atmospheric, first through the ordinary boiler and then through the low-pressure boiler, means for utilizing the heat of the gases in the two boilers, and a turbine placed in the discharge flue of said low-pressure boiler and operated by the energy due to the pressure of the waste gases from said low-pressure boiler, said turbine acting to maintain the said hot gases at a pressure substantially above atmospheric in their passage through the two boilers, the said low-pressure boiler being operated at such a pressure of steam generation that the temperature is sufficiently low to allow of the condensation of the water vapour in the said hot gases.

6. In the employment for power production of the hot gases resulting from the combustion of fuel and comprising non-condensable gases and water vapour, a plant comprising an ordinary boiler, a low-pressure boiler, a blower for supplying air under a pressure substantially above atmospheric for burning the fuel and for driving the hot gases, at a pressure substantially above atmospheric, first through the ordinary boiler and then through the low-pressure boiler, means for utilizing the heat of the gases in the two boilers, a turbine placed in the discharge flue of said low-pressure boiler and operated by the energy due to the pressure of the waste gases from said low-pressure boiler, said turbine acting to maintain the said hot gases at a pressure substantially above atmospheric in their passage through the two boilers, and means whereby said turbine drives said blower, the said low-pressure boiler being operated at such a pressure of steam generation that the temperature is sufficiently low to allow of the condensation of the water vapour in the said hot gases.

I hereby sign my name to this specification.

JAMES GEORGE WEIR.